US006919888B1

(12) United States Patent
Perani et al.

(10) Patent No.: US 6,919,888 B1
(45) Date of Patent: Jul. 19, 2005

(54) COMPUTER DRAWING SHAPE MANIPULATION WITH ENVELOPE MESHES

(75) Inventors: Michael J. Perani, San Rafael, CA (US); Yong Joo Kil, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 423 days.

(21) Appl. No.: 09/898,676

(22) Filed: Jul. 3, 2001

(51) Int. Cl.[7] .............................................. G06T 17/00
(52) U.S. Cl. ...................................................... 345/420
(58) Field of Search ................................ 345/619, 661, 345/672, 622, 645, 646, 647, 630, 418, 419, 417, 618

(56) References Cited

U.S. PATENT DOCUMENTS

| | | | |
|---|---|---|---|
| 4,908,874 A | | 3/1990 | Gabriel |
| 5,175,808 A | | 12/1992 | Sayre |
| 6,130,673 A | * | 10/2000 | Pulli et al. .................. 345/428 |
| 6,204,860 B1 | * | 3/2001 | Singh .......................... 345/420 |

FOREIGN PATENT DOCUMENTS

JP 411025293 A * 1/1999 ........... G06T/17/20

OTHER PUBLICATIONS

MAYA Complete 2; Harovas, Gibbs, Lee; 2000; Sybex, pp. xxii–xxiii and 156–162 and 207 and 381–410.*

Jonas Gomes, et al., "*Warping and Morphing of Graphical Objects*," Morgan Kaufmann Publishers, Inc. ISBN 1–55860–464–2, pp.: 209–210, 250–252, 383–386, 1999.

Paul S. Heckbert, "*Fundamentals of Texture Mapping and Image Warping*," Master's Thesis under the direction of Carlo Séquin, Dept. of Electrical Engineering and Computer Science, University of California, Berkeley, CA 94720, pp. 1–86 and 1 pg. errata, Jun. 17, 1989.

(Continued)

*Primary Examiner*—Sumati Lefkowitz
*Assistant Examiner*—Scott Wallace
(74) *Attorney, Agent, or Firm*—Fish & Richardson P.C.

(57) ABSTRACT

Methods and apparatus, including computer program products, implementing techniques for performing envelope-based computer graphics operations on vector objects in an image. An envelope in an image generally contains an original drawing object. The envelope is a manipulable graphic object defining a coordinate remapping that is applied to generate a resulting drawing object for any original drawing object in the envelope. In one embodiment, the envelope has an interior control point that is an anchor point. User manipulation of the interior control point redefines the coordinate remapping. In another embodiment, a precision variable determines how closely an object in the envelope will follow the envelope when the corresponding resulting object is generated. Additional control points can be added to the original contained object if necessary to achieve the required precision before applying the coordinate remapping. In another embodiment, C1 or C2 continuity at curve anchor points is preserved over envelope manipulations.

17 Claims, 3 Drawing Sheets

OTHER PUBLICATIONS

B.E.J. Dahlberg, et al., "*Shape Preserving Approximations*," The mathematics of surfaces II, Clarendon Press, Oxford, pp. 419–426, 1987.

Nur Arad, "*Grid–distorting on nonrectangular grids*," Computer Aided Geometric Design, ISSN 0167–8396, CAGDEX 15(5), pp. 475–493, 1998.

Max Froumentin, et al., "*A Vector–based Representation for Image Warping*," The International Journal If the Eurographics, ISSN 0167–7055, vol. 19, No. 3, pp. C419–C425, Aug. 2000.

Chi–Wing Fu, et al., "*Computing Visibility for Triangulated Panoramas*," Rendering Techniques '99, SpingerComputer-Science, pp. 161–173, SpingerWienNewYork, 1999.

Pierre Landau, et al., "*Subset Warping: Rubber Sheeting with Cuts*," CVGIP: Graphical Models and Image Processing, ISSN 1049–9652, vol. 56, No. 3, pp. 247–266, May 1994.

George Wolberg, "*Skeleton–based image warping*," The Visual Computer, International Journal of Computer Graphics, vol. 5, No. 1/2, Mar. 1989.

George Wolberg, "*Recent Advances in Image Morphing*," IEEE Proceedings, CGI '96: Computer Graphics International, Pohang, Korea, pp. 64–71, Jun. 24–28, 1996.

George Wolberg, "*Digital Image Warping*," IEEE Computer Society Press Order No. 1944, Los Alamitos, California, ISBN 0–8186–8944–7, pp. 222–240, 1990.

* cited by examiner

COMPUTER DRAWING SHAPE MANIPULATION WITH ENVELOPE MESHES

BACKGROUND

This invention relates computer graphics applications.

A frequent task in computer graphics applications is to modify the shape of a graphical object using another graphical object as a guide. This technique is often referred to as enveloping. A typical example of enveloping is to use the outline of a shape to shrink and elongate letterforms, that is, curves defining the outlines of characters' shapes, to simulate the appearance of a banner curling in the wind. The banner shape, which is much simpler than the letterforms themselves, can be manipulated using standard point editing controls. Control points of the letterforms then conform to the general shape of the controlling outline.

A number of computer graphics applications include an enveloping capability. Examples of such computer graphics applications are Freehand® by Macromedia Incorporated (San Francisco, Calif.), Corel DRAW® and KPT Vector Effects®, both by Corel Corporation (Ottawa, Ontario, Canada). These applications use an "outline-sheet" metaphor, where the objects to be deformed are placed on the sheet bounded by an envelope. The user interacts with the envelope by tugging on its outline. As the envelope is manipulated, the details of the objects lying within the envelope move to preserve their position relative to the envelope. For example, if a 2-dimensional (2D) u-v coordinate system is imposed on the envelope, the u-v positions of objects inside the envelope will be the same before and after the edit. The envelope can be very simple and have only a few control points. An object contained inside the envelope can be edited rather effortlessly, even if the object has a multitude of control points. This simple control point editing is the primary attraction of enveloping.

A number of three-dimensional (3D) modeling applications include lattice deformations that are the 3D equivalents of envelopes. Examples of such applications are SoftImage® by SoftImage Corporation (Montreal, Quebec, Canada), and Alias/Wavefront Maya® by Alias/Wavefront Incorporated, a division of Silicon Graphics (Mountain View, Calif.). In lattice deformations, an m×n lattice of envelopes is arranged in three-dimensional space. Typically the lattice is a closed lattice, forming a tube-like structure around a 3D object. Similar to the envelopes in a 2D drawing application, the user can manipulate the lattice, which is a fairly simple 3D object, and thereby change a more complex object lying inside the lattice.

A number of computer image processing applications include a variant of envelopes to perform image deformations. One example of such an application is described by Ron Brinkmann in "The Art and Science of Digital Compositing" (pages 58–63, Morgan Kaufmann publishers, 1999). In these systems, an m×n grid of envelopes is superimposed over an image, thus defining the default mapping of the image pixels into the u-v coordinate system of the grid. A duplicate copy of the image and grid pair (the destination pair) is typically displayed beside the original pair (the source pair). These systems allow either the source or destination grids to be manipulated. When either grid is manipulated, the destination image is regenerated based on preserving the u-v positions of the image pixels relative to the destination grid. This is analogous to the regeneration of the contained object in the drawing applications discussed above.

Even though the drawing applications described above provide a flexible working environment for the users, they do exhibit some shortcomings, which are addressed by the present invention.

SUMMARY

In general, in one aspect, this invention provides methods and apparatus, including computer program products, implementing and using techniques for performing envelope-based computer graphics operations on vector objects in an image. An envelope in an image generally contains an original drawing object. The envelope is a manipulable graphic object defining a coordinate remapping that is applied to generate a resulting drawing object for any original drawing object in the envelope. In one embodiment, the envelope has an interior control point that is an anchor point. User manipulation of the interior control point redefines the coordinate remapping. In another embodiment, a precision variable determines how closely an object in the envelope will follow the envelope when the corresponding resulting object is generated. Additional control points can be added to the original contained object if necessary to achieve the required precision before applying the coordinate remapping. In another embodiment, C1 (first derivative) or C2 (second derivative) continuity at curve anchor points is preserved over envelope manipulations.

The invention can be implemented to realize one or more of the following advantages. A higher degree of control over shape manipulation capabilities of the envelopes can be achieved. Interior control, local refinement of meshes, source envelopes, variable precision of distortion, curve continuity preservation, isolation of editing focus and preset visual cues provide a higher level of artistic expression and usability to computer drawing application enveloping compared to conventional computer drawing applications. Interior control does not have to be rectilinear, which allows flexibility and simplicity in control of fine detail. A user can isolate the source art or envelope for editing, which is advantageous when they overlap. The coordinate remappings are managed in a way that prevents loss of curve tangent and curvature continuity.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The invention will now be described in greater detail by way of example. First, a general description of the application architecture will be given. This general description will be followed by individual sections for each of the following features: interior control points, local refinement, source envelopes, editing isolation, precision, curve continuity preservation, and preset visual cues. In the following description, the shape to be distorted will be referred to as "art." The guiding shape to which the art will be distorted will be referred to as an "envelope". The term envelope encompasses both an outline-only envelope as well as an envelope, such as a mesh, that has interior control. An envelope may be referred to as a "mesh" or an "envelope mesh" to emphasize that in a particular situation both an outline and interior points influence the art's shape. A combination of art and envelope mesh may be referred to as an "envelope group."

In order to explain the term mesh, it will be useful to start with the definition of a grid. A grid is an array of m×n control points or lattice points. Each lattice point in the grid has a position and four tangents, one in each of the positive and negative u and v directions, respectively. One exception is lattice points on the edge of the grid, which have fewer tangents. The position of the tangent vectors define controlling curves connecting each pair of adjacent control points in the grid. A mesh is a grid that may have extra control points between the existing lattice points. These extra control points are defined by a position, also referred to as anchor point, and two tangents. The tangents are either in the positive and negative u direction or in the positive and negative v direction, depending on whether the curve on which the extra control point is located connects points that have a common u coordinate or a common v coordinate.

The present implementation is not a stand alone drawing application, but rather an addition to an existing drawing application, such as Adobe® Illustrator®, which features an extensible and open plug-in architecture. The existing application, or host application, includes standard drawing application features such as hierarchical object list management, shape creation utilities, and object control point editors. Furthermore, the host application includes a feature for creating color transition meshes.

Figure 1:
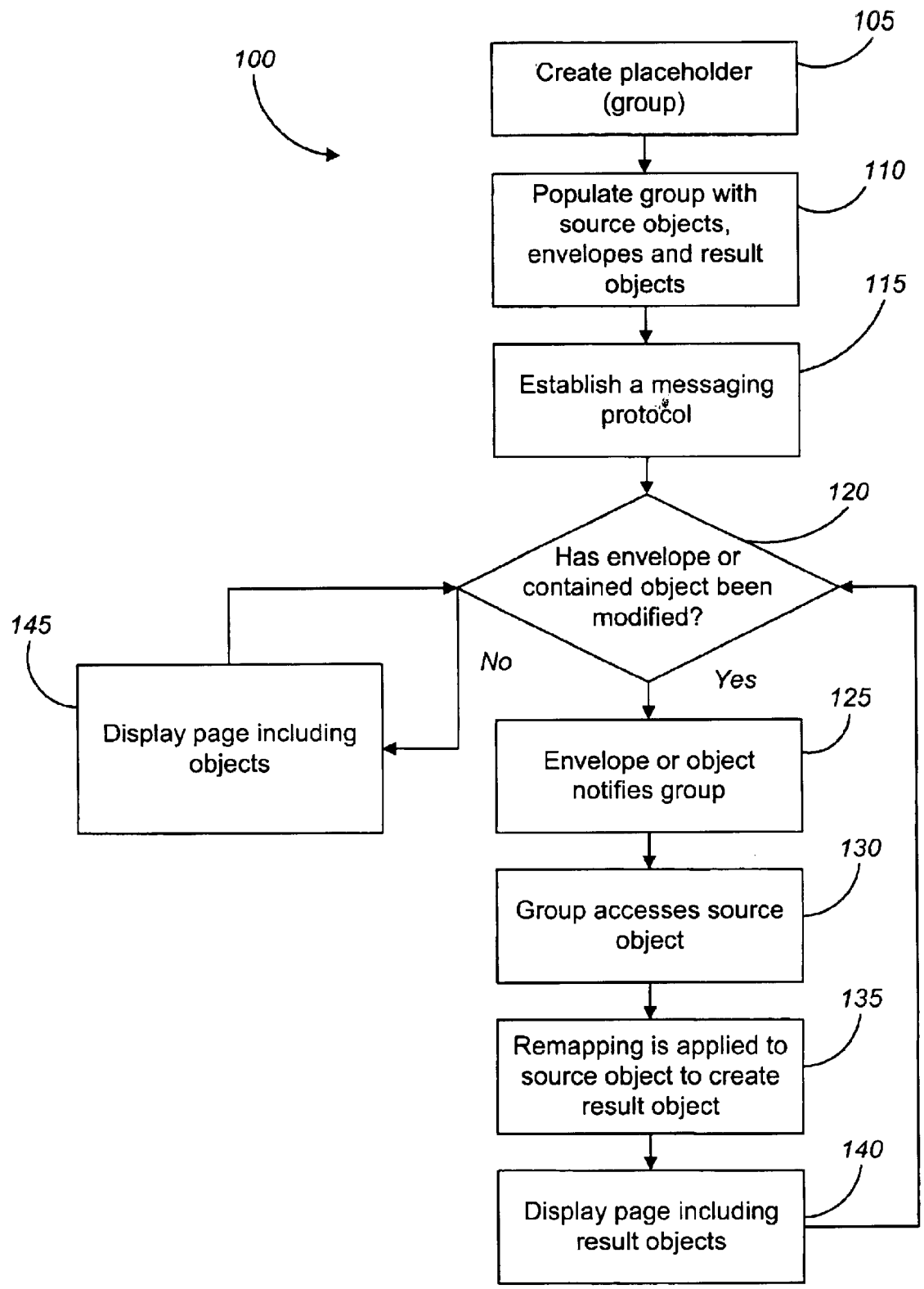
FIG. 1 is a block diagram showing a general process for modifying objects using an envelope.

Conventional enveloping applications typically embed an envelope and the object or objects contained inside the envelope in a hierarchal object list so that the objects can inherit the behavior of standard drawing application objects. Examples of such behavior include precedence in the object list, colorization and printing. The application operating in accordance with the invention is no different in this respect. As shown in FIG. 1, a placeholder, or group, is created in the object list (105). The group is populated with the original contained objects (also referred to as the source art or source objects), the envelopes (source and destination), and versions of the contained objects which have undergone the u-v coordinate remapping (result objects) (110). A messaging protocol is then established (115), which ensures that the result objects are regenerated whenever the envelopes or contained objects are modified. The procedure checks if an envelope or an object contained inside the envelope has been modified (120). If not, the page with the objects are displayed (145). If an envelope or an object has been modified, the envelope or object notifies the group when it has been edited (125) and the group in turn accesses the source objects (130), of which there can be many, and creates result objects by successively applying the coordinate remapping to them (135). Finally, the result objects are displayed (140).

In one implementation, the source envelope is implicit, so that it is not explicitly placed by the user or displayed for modification by the user. In this case, the source envelope is defined by the bounding box of the source art, in whatever way that is defined by the application. For example, when the user selects one or more objects and applies an envelope to the objects, the bounding box of the objects defines the source envelope or mesh and the user's selection and the user's subsequent editing, if any, defines the destination envelope. If the source envelope is implicit to the user, it can be represented implicitly in the envelope group as well, as it can always be derived from the source art.

Interior Control Points

Figure 2:
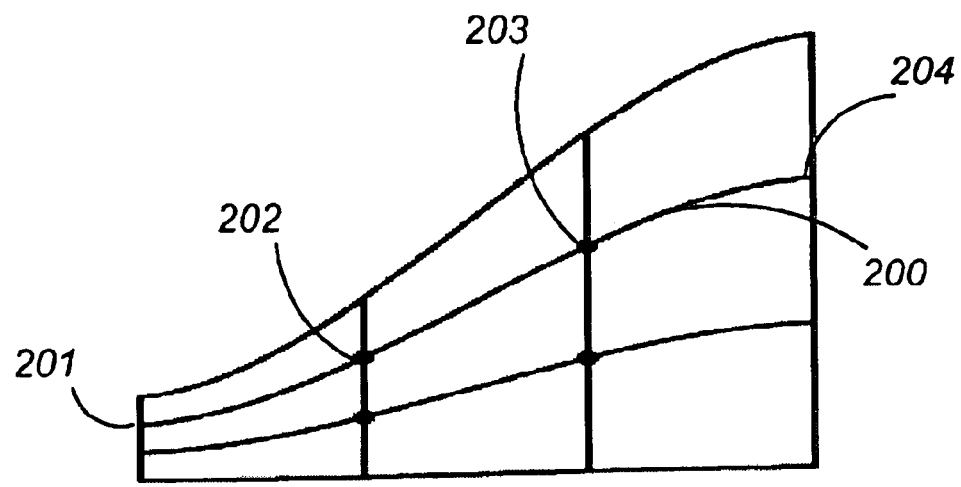
FIG. 2 is a schematic illustration of an envelope mesh with interior control points in accordance with the invention.

There are two distinct methods of introducing interior control points into envelopes, which will be discussed in this and the next section. In the first method, meridians of constant u or v are introduced into the envelope, as shown in FIG. 2. The number of control points inserted in u or v corresponds to the dimension of the other variable. Thus, if a u meridian (200) is added to a 3×4 grid to create a 4×4 grid, four new control points (201, 202, 203, 204) will be added. This creates a grid-like matrix of envelope control points similar to the control points found in image processing applications.

Local Refinement

Figure 3:
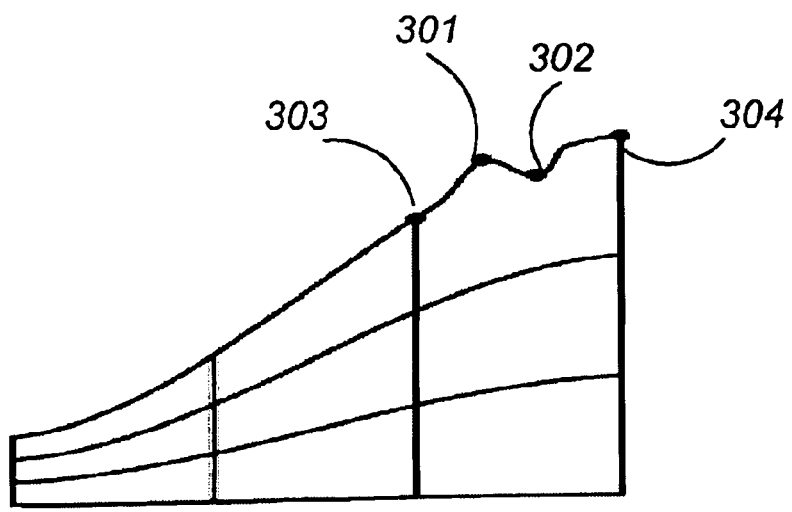
FIG. 3 is a schematic illustration of an envelope mesh with additional control points in accordance with the invention.

The second method of introducing interior control points avoids introducing an entire row or column of control points. Instead, single additional control points are introduced. As can be seen in FIG. 3, these single additional control points (301, 302) are localized to different portions of the envelope between the existing control points (303, 304). In so doing, details in the source object can be isolated for more precise user control of the u-v coordinate remapping. In the application in accordance with the invention, the user chooses a tool that adds control points and indicates where on the mesh the insertion should be made. The indicated location becomes a control point and can then be manipulated identically to any other envelope control.

Source Envelopes

In the image processing applications described in the background section, it was noted that a source and destination mesh provide a higher degree of control of deformations than a destination mesh alone. It was also pointed out that in the image processing application the source and destination envelopes are typically displayed side by side. This side-by-side editing is not feasible in a drawing application, because the object being enveloped typically resides within the context of an entire page description. Therefore, in the application in accordance with the invention, the source envelope resides in the group that handles the messaging between envelopes and contained objects, thus having a dedicated position within the page's hierarchical object list. By being in this position, the effects of edits to the source envelope can be seen in relationship to the other objects which will appear in the final printed page.

In the drawing application in accordance with the invention, every page position lying inside the source mesh can be mapped to the u-v coordinate system of the source mesh. The u-v positions of the source object's control points are defined by this mapping of page positions. In the destination mesh, the u-v coordinate values of the control points are held constant, but since the destination mesh is different than the source mesh, the location of the control points on the page will be different. The destination object is generated programmatically based on the source object and the source and destination meshes, respectively, so a user never interacts directly with the destination object.

Editing Isolation

The control points of contained objects in standard enveloping applications typically reside within the extent of the envelope. Furthermore, in the outline-sheet model, only the outlines of the envelope influence the regeneration of the contained object. As a consequence, the control points of the contained object and the control points of the envelope seldom overlap, and the user's intention with respect to manipulating a particular control point is clear.

Figure 6:
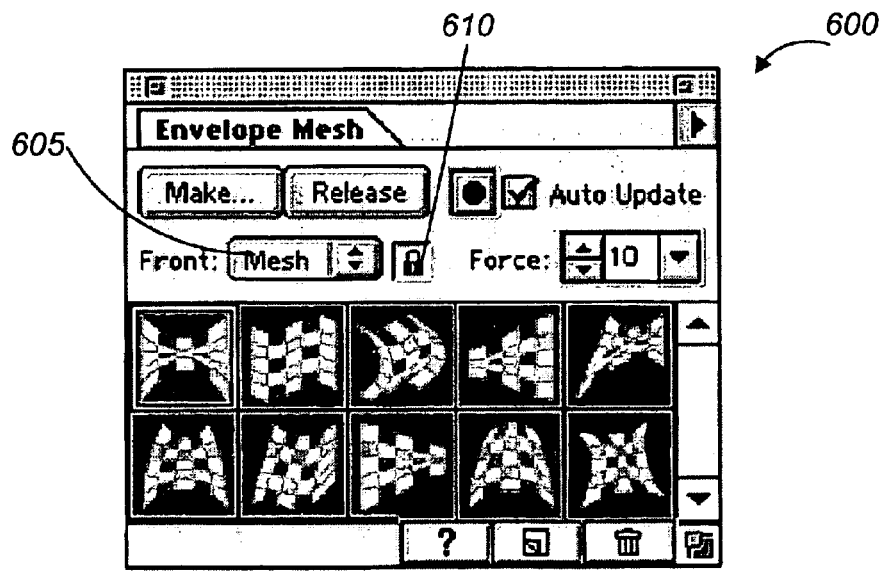
FIG. 6 is a schematic illustration of an interface showing preset visual cues and editing focus in accordance with the invention.

When interior controls and source envelopes are introduced, the user's intention is not always clear. The application in accordance with the invention provides two mechanisms for establishing the focus of interactive editing. Typical drawing application point editing tools honor the front to back ordering of the page, that is, objects which appear on top of other objects will be treated preferentially when the application detects which control point a user clicks at. The application in accordance with the invention has a variable front to back ordering of the source objects and envelopes, under user control, specific to that purpose. Conventional, built-in drawing application commands such as move forward, or move backward in the hierarchical object list are not well suited to this task, as the envelopes are generally rendered as outlines and it is unclear from a screen rendering if the source mesh, destination mesh, or the source shape is closest to the front. The source shape refers to either a single source object or an arbitrarily large collection of source objects. The user control interface in accordance with the invention simply displays a list of the three choices (source mesh, destination mesh, or source shape) and asks which choice should have precedence. In FIG. 6, a version of a user interface (600) is shown in which the option for a user to interact with the source mesh is disabled, so the user can only choose between letting the source shape or the destination mesh be at front by selecting an option from a popup menu (605). Therefore the destination mesh is referred to simply as the "mesh" in the FIG. 6.

A second mechanism of indicating preference is to hide or lock certain elements in the envelope group. Elements that are hidden or locked cannot respond when a user clicks at a control point. A combination of these two techniques yields satisfactory results, that is, establishes a rule of hiding or locking the objects that are not indicated as the focus of editing. This can be performed automatically or be left as an option to be selected by a user. In FIG. 6 the locking option is selected by clicking on the padlock symbol (610).

Curve Continuity Preservation

Tangent and curvature continuity are distinctive properties of the curves used in computer drawing applications. The design of character glyphs is particularly focused on establishing forms that are visually appealing. Curve definitions in drawing applications are generally in the form of cubic polynomial functions of four adjacent control points. Typical examples include Bezier, Hermite and B splines, with Bezier being the most prevalent. The mathematical formulation of Bezier curves does not guarantee specific tangent and curvature continuity in the way other formulations, such as B splines do. For example, with Bezier splines, achieving tangent continuity requires three adjacent control points to be co-linear. With the introduction of interior controls in the envelope, it is not unusual for this relationship of control points to be broken.

Figure 5:
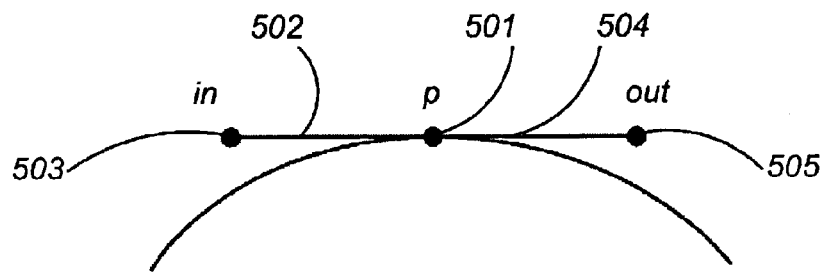
FIG. 5 is a schematic illustration of curve continuity preservation in accordance with the invention.

The control points in computer drawing applications are typically differentiated as anchor points and tangent handles. Each control point having a single anchor point (p) (501), a preceding tangent (502) bounded by a tangent handle (in) (503), and a following tangent (504) bounded by a tangent handle (out) (505), as can be seen in FIG. 5. With this user interface paradigm, a four point Bezier spline is defined by two neighboring anchor points, the out tangent of the first anchor point, and the in tangent of second anchor point.

In one implementation of the invention, tangent or curvature continuity for a Bezier spline is preserved by:

(1) storing the continuity state of each anchor point and the ratio of the anchor point relative to the tangent handles;

(2) remapping the tangent handles in accordance with the distortion field; and (3) relocating the anchor point.

If the curve tangent or curvature is not continuous at the control point, the anchor point simply moves according to the distortion field, independent of the remapped tangent handles. If the curve tangent or curvature is continuous at the point, the anchor point is moved so that the ratio of the anchor point's position relative to the remapped tangent handles is identical to the ratio prior to remapping. This method insures the preservation of the control point's original continuity.

Precision

Figure 4:
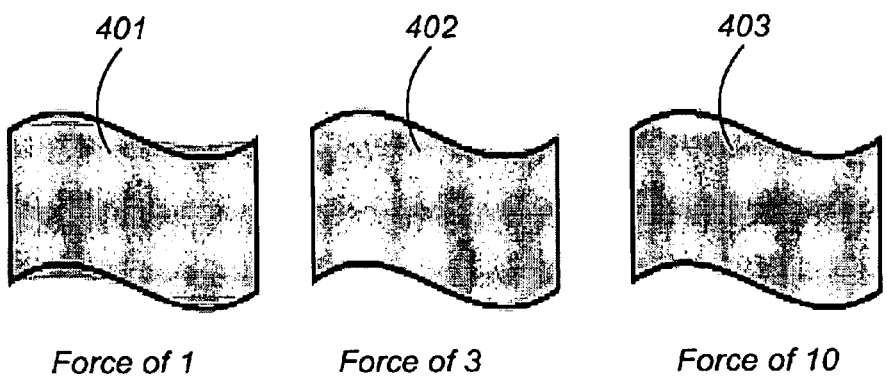
FIG. 4 is a schematic illustration of an envelope having different precision values set in accordance with the invention.

The distortion of the contained object is accomplished by remapping the Cartesian positions of curve controls such that u-v positions are preserved in distorted and undistorted spaces. With envelope meshes, subtle distortion effects can be created, such as rippling water. To provide the artistic control necessary to get a variety of effects from a single envelope, it is necessary to introduce a precision variable that determines how closely the contained object will follow the envelope. This behavior is accomplished by introducing additional control points on the original curves prior to the coordinate remapping, with a variable frequency of insertion determined by the user. The higher value of the precision variable, the better the control points follow the curve. An example can be seen in FIG. 4, where the precision variable has the values 1 (401), 3 (402) and 10 (403), respectively. In this example, the precision variable is used to represent the number of additional anchor points inserted between the original anchor points of the source art. A second benefit of having the variable insertion under user control is that the performance of distortion of large amounts of data can be reasonably managed.

Preset Visual Cues

Drawing applications often include collections of premade envelopes. Conventionally, these presets are presented pictorially in a window where a user may create an envelope simply by selecting a swatch that has been rendered with a representation of the envelope. The rendering of the envelopes generally consists of line drawings of the controlling outlines. With envelope meshes, this type of rendering is insufficient. For example, two 3×3 envelopes that differ only by the position of the central control point will appear identical. A preferable approach is to render an envelope group into the swatch whose contained object possesses interior details that have a familiar structure. An example of an object with such interior details is a collection of squares of two or more colors arranged in a checkerboard pattern, as can be seen in FIG. 6.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A computer program product for performing computer graphics operations on an image represented by digital data, the product tangibly embodied in a computer-readable medium or propagated signal, the product comprising instructions operable to cause a programmable processor to:

receive a representation of a digital image, the image comprising drawing objects organized in a hierarchical relationship;

receive a user input defining an envelope having an outline, the envelope containing a first original drawing object in the image, the envelope being a manipulable graphic object defining a coordinate remapping, the coordinate remapping being applied to generate a resulting drawing object for any original drawing object contained in the envelope, the first original and its resulting drawing object each being a vector object;

wherein the envelope has an interior control point, the interior control point being an anchor point interior to the envelope outline and not being a lattice point, the product further comprising instructions to:

receive a user input manipulating the interior control point and, in response, redefine the coordinate remapping.

2. A computer program product for performing computer graphics operations on an image represented by digital data, the product tangibly embodied in a computer-readable medium or propagated signal, the product comprising instructions operable to cause a programmable processor to:

receive a representation of a digital image, the image comprising drawing objects organized in a hierarchical relationship;

receive a user input defining an envelope having at outline, the envelope containing a first original drawing object in the image, the envelope being a manipulable graphic object defining a coordinate remapping, the coordinate remapping being applied to generate a resulting drawing object for any original drawing object contained in the envelope, the first original and its resulting drawing object each being a vector object;

receive from a user a precision input signifying how closely an object contained in the envelope will follow the envelope when the corresponding resulting object is generated and, in response, introduce additional control points to the original contained object if necessary to achieve the precision before applying the coordinate remapping.

3. A computer program product for performing computer graphics options on an image represented by digital data, the product tangibly embodied in a computer-readable medium or propagated signal, the product comprising instructions operable to cause a programmable processor to:

receive a representation of a digital image, the image comprising drawing objects organized in a hierarchical relationship;

receive a user input defining an envelope having an outline, the envelope containing a first original drawing object in the image, the envelope being a manipulable graphic object defining a coordinate remapping, the coordinate remapping being applied to generate a resulting drawing object for any original drawing object contained in the envelope, the first original and its resulting drawing object each being a vector object; and determine whether an original curve of the first original drawing object at an original anchor point in the envelope has C1 continuity at the original anchor point and, if it does not, move the anchor point solely according to the coordinate remapping, and if it does, move the anchor point to preserve the C1 continuity in a resulting curve in the resulting drawing object at a resulting anchor point corresponding to the original anchor point.

4. The product of claim 3, further comprising instructions to:

determine whether the C1 continuity is also C2 continuity at the original anchor point and, if it is not, move the anchor point solely according to the coordinate remapping, and if it is, move the anchor point to preserve the C2 continuity in the resulting curve at the resulting anchor point.

5. The product of claim 3 or 4, wherein:

the original anchor point is between two tangent handles; and the continuity is preserved by first storing a continuity state of the original anchor point and the relative position of the original anchor point between the two tangent handles, then remapping the tangent handles in accordance with the envelope, and then relocating the anchor point between the remapped tangent handles in accordance with the stored relative position.

6. The product of claim 1 or 3, further comprising instructions to:

receive from a user a precision input signifying how closely an object contained in the envelope will follow the envelope when the corresponding resulting object is generated and, in response, introduce additional control points to the original contained object if necessary to achieve the precision before applying the coordinate remapping.

7. The product of claim 1 or 2, further comprising instructions to:

determine whether an original curve of the first original drawing object at an original anchor point in the envelope has C1 continuity at the original anchor point and, if it does, preserve the C1 continuity in a resulting curve in the resulting drawing object at a resulting anchor point corresponding to the original anchor point.

8. The product of claim 1, 2 or 3, wherein the image comprises drawing objects organized in a hierarchical relationship defined by an object list, the product further comprising instructions to:

cause a group to be created in the object list;

cause the group to be populated with all original objects contained in the envelope;

cause the group to be populated with all result objects generated in accordance with the coordinate remapping; and cause the group to be rendered to display the result objects and not display the original objects in the envelope.

9. The product of claim 8, further comprising instructions to:

cause the group to be populated with a destination envelope.

10. The product of claim 8, further comprising instructions to:

cause the group to be populated with a source envelope.

11. The product of claim 1, 2, or 3, further comprising instructions to:

receive an input requesting one or more single additional control points localized to portions of the envelope be introduced into the envelope, wherein the additional control point is not a lattice point.

12. The product of claim 1 or 3, further comprising instructions to:

provide variable precision of distortion by introducing additional control points on one or more original curves of one or more contained objects before coordinate remapping, with a variable frequency of insertion that can be determined in response to user input.

13. The product of claim 1, 2, or 3, further comprising instructions to:

provide for selection in a user interface an option to select one of multiple pre-made envelope meshes having interior control points, each rendered as an envelope group into a swatch with interior detail.

14. The product of claim 13, wherein the swatch has a checkerboard pattern of two or more colors.

15. The product of claim 1, 2, or 3, further comprising instructions to:

display for a user an option to select explicitly a focus for editing operations performed by the user, the focus being selected from a set including at least the envelope and a source shape in the envelope.

16. The product of claim 15, further comprising instructions to:

display for the user an option to hide or lock the envelope or the source shape, wherein an element that is hidden or locked cannot respond when a user clicks at a control point of the element.

17. The product of claim 1, 2, or 3 wherein the envelope is a mesh.

* * * * *

UNITED STATES PATENT AND TRADEMARK OFFICE
CERTIFICATE OF CORRECTION

PATENT NO. : 6,919,888 B1
DATED : July 19, 2005
INVENTOR(S) : Michael J. Perani and Yong Joo Kil It is certified that error appears in the above-identified patent and that said Letters Patent is hereby corrected as shown below:

Column 8,
Line 7, delete "at", and replace with -- an --;
Line 23, delete "options" and replace with -- operations --.

Signed and Sealed this

Sixth Day of December, 2005

JON W. DUDAS
*Director of the United States Patent and Trademark Office*